US011653109B2

(12) United States Patent
Koizumi et al.

(10) Patent No.: US 11,653,109 B2
(45) Date of Patent: May 16, 2023

(54) SENSOR SYSTEM, IMAGE PROCESSING APPARATUS, IMAGE PROCESSING METHOD, AND PROGRAM

(71) Applicant: Sony Interactive Entertainment Inc., Tokyo (JP)

(72) Inventors: Makoto Koizumi, Tokyo (JP); Jun Horie, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/635,301

(22) PCT Filed: Aug. 28, 2019

(86) PCT No.: PCT/JP2019/033708
§ 371 (c)(1),
(2) Date: Feb. 14, 2022

(87) PCT Pub. No.: WO2021/038751
PCT Pub. Date: Mar. 4, 2021

(65) Prior Publication Data
US 2022/0311957 A1 Sep. 29, 2022

(51) Int. Cl.
*H04N 5/351* (2011.01)
*H04N 5/374* (2011.01)
(Continued)

(52) U.S. Cl.
CPC .......... *H04N 5/351* (2013.01); *H04N 5/3745* (2013.01)

(58) Field of Classification Search
CPC ...... H04N 5/351; H04N 5/3745; H04N 5/378; H04N 5/379; H04N 5/35563; H04N 5/341
See application file for complete search history.

(56) References Cited

U.S. PATENT DOCUMENTS 10,097,779 B2  10/2018 Park
10,598,936 B1   3/2020 Berkovich
(Continued)

FOREIGN PATENT DOCUMENTS

JP  2017085549 A   5/2017
JP  2018186478 A  11/2018
(Continued)

OTHER PUBLICATIONS

Notice of Reasons for Refusal for related JP Application No. 2021541866, 4 pages, dated Oct. 18, 2022.
(Continued)

*Primary Examiner* — Marly S Camargo
(74) *Attorney, Agent, or Firm* — Matthew B. Dernier, Esq.

(57) ABSTRACT

A sensor system includes a sensor array and a gradation determination section. The sensor array includes a first sensor and a second sensor. The first sensor is configured to detect, with a first sensitivity, a variation in a quantity of light at a first pixel address. The second sensor is configured to detect, with a second sensitivity that is lower than the first sensitivity, a variation in a quantity of light at a second pixel address that is adjacent to or coincides with the first pixel address. The gradation determination section is configured to determine, when the first sensor generates a first event signal in response to a luminance variation event, a gradation of an object having caused the luminance variation event to occur, depending on whether or not the second sensor generates a second event signal in response to the luminance variation event.

7 Claims, 11 Drawing Sheets

(51) Int. Cl.
   *H04N 5/378*   (2011.01)
   *H04N 5/355*   (2011.01)
   *H04N 5/3745*  (2011.01)

(56) References Cited

U.S. PATENT DOCUMENTS

| | | | |
|---|---|---|---|
| 11,463,636 B2* | 10/2022 | Berkovich | H04N 5/35536 |
| 2015/0262068 A1* | 5/2015 | Ruan | G06N 20/00 |
| | | | 706/12 |
| 2015/0194454 A1* | 7/2015 | Kim | H01N 27/14638 |
| | | | 250/208.1 |
| 2016/0284743 A1 | 9/2016 | Mellot | |
| 2017/0059399 A1* | 3/2017 | Suh | H04N 5/378 |
| 2017/0127005 A1 | 5/2017 | Park | |
| 2017/0195556 A1* | 7/2017 | Emi | H04N 21/44008 |
| 2018/0262705 A1 | 9/2018 | Park | |
| 2019/0281238 A1 | 9/2019 | Kalgi | |
| 2020/0128205 A1 | 4/2020 | Sakakibara | |
| 2020/0351455 A1 | 11/2020 | Niwa | |
| 2022/0070392 A1* | 3/2022 | Izawa | H04N 5/351 |
| 2022/0109799 A1* | 4/2022 | Niwa | H04N 5/3456 |
| 2022/0264036 A1* | 8/2022 | Niwa | H04N 5/3696 |
| 2022/0311966 A1* | 9/2022 | Koizumi | H04N 5/351 |

FOREIGN PATENT DOCUMENTS

| | | |
|---|---|---|
| JP | 2019134271 A | 8/2019 |
| WO | 2019135411 A1 | 7/2019 |

OTHER PUBLICATIONS

International Search Report for corresponding PCT Application No. PCT/JP2019/033708, 2 pages, dated Nov. 12, 2019.
Patrick Lichtsteiner, et al., "A 128×128 120dB 15μs Latency Asynchronous 2 Temporal Contrast Vision Sensor," IEEE Journal of Solid-State Circuits, vol. 43, No. 2, 12 pages, Feb. 1, 2008.
International Search Report for related PCT Application No. PCT/JP2019/033706, 2 pages, dated Nov. 12, 2019.

* cited by examiner

FIG.2A
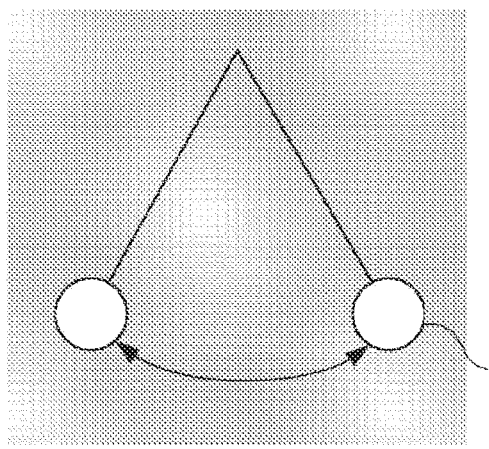  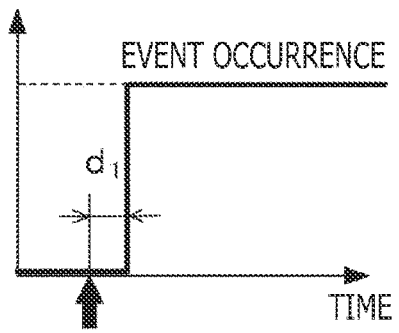
FIG.2B
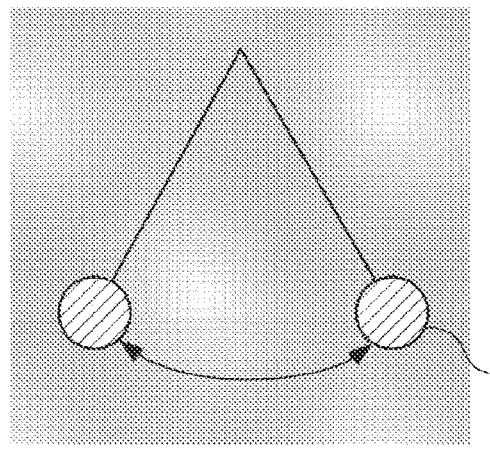  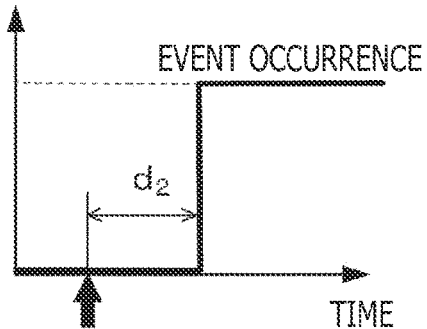

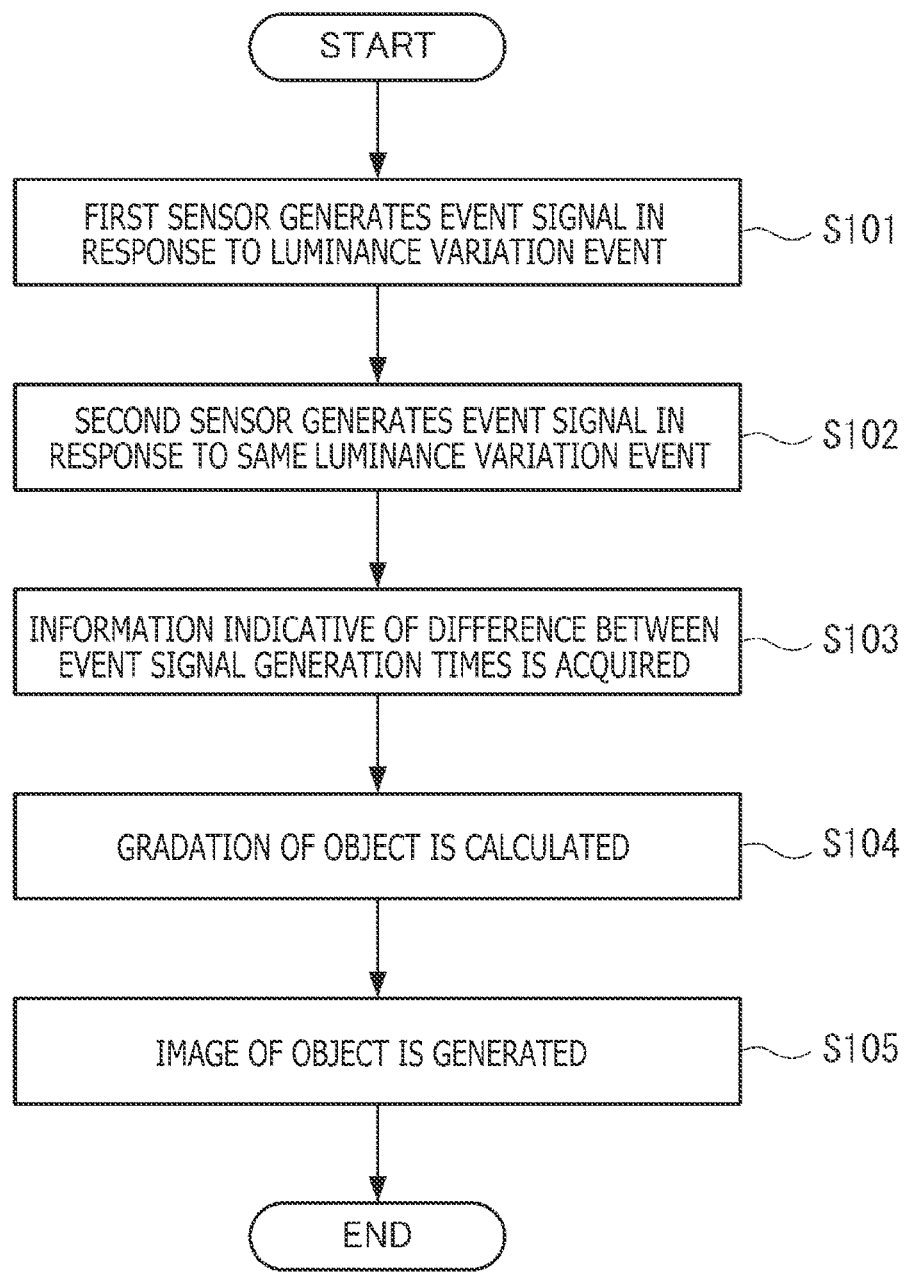

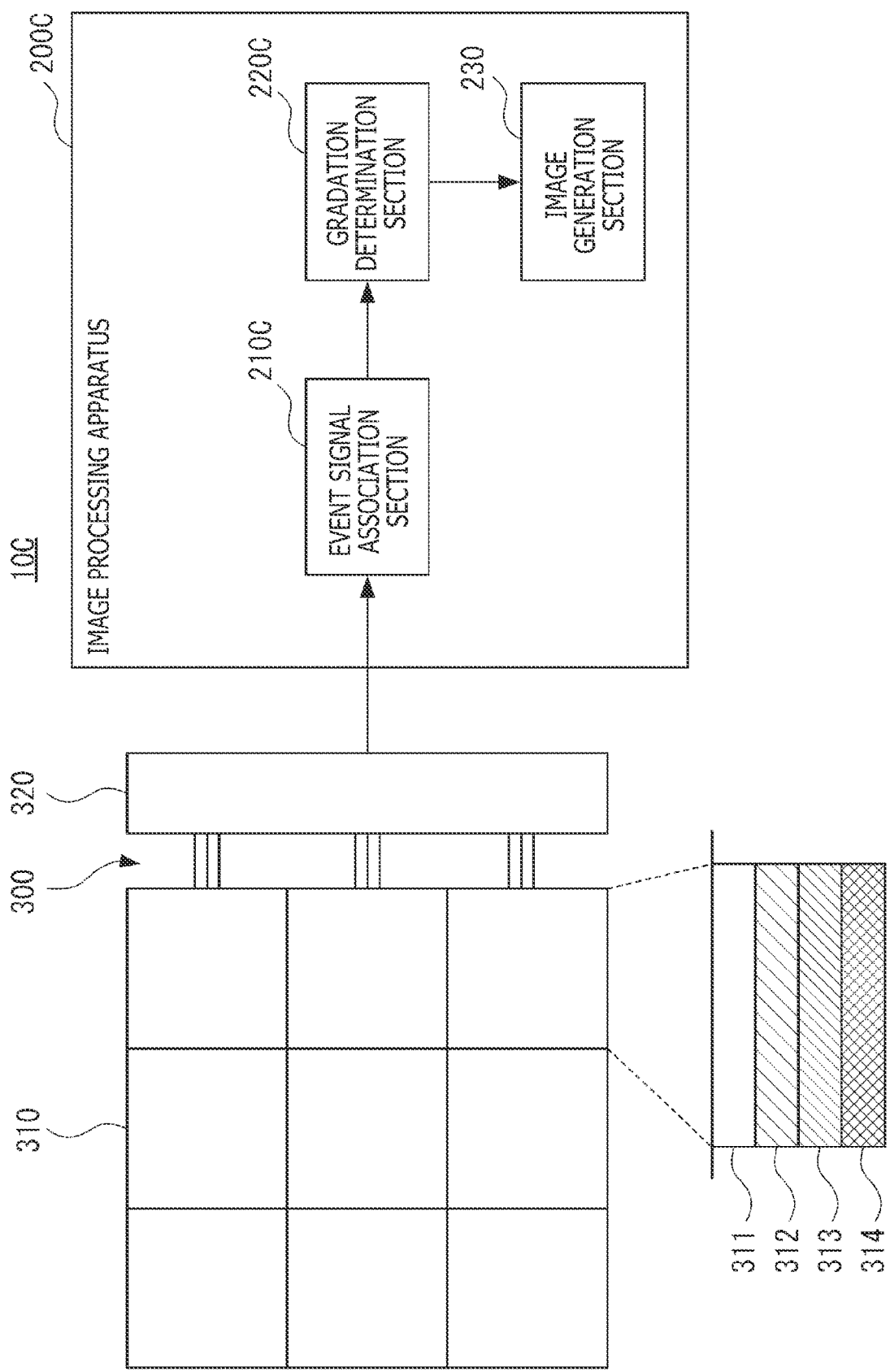

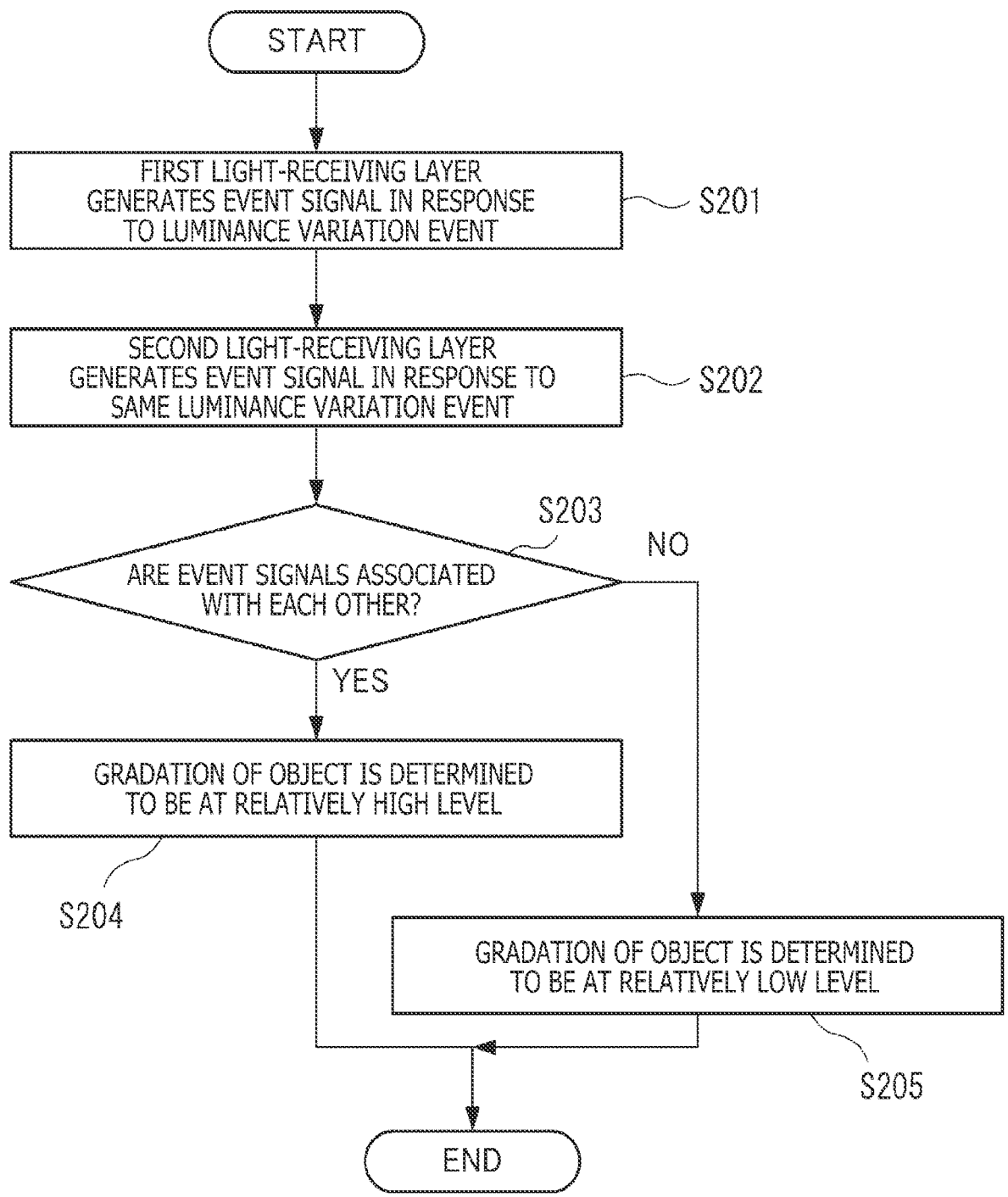

SENSOR SYSTEM, IMAGE PROCESSING APPARATUS, IMAGE PROCESSING METHOD, AND PROGRAM

TECHNICAL FIELD

The present invention relates to a sensor system, an image processing apparatus, an image processing method, and a program.

BACKGROUND ART

Image sensors such as a charge coupled device (CCD) and a complementary metal oxide semiconductor (CMOS) are each a synchronous solid-state image sensor that picks up image data (frames) in synchronism with a synchronizing signal such as a vertical synchronizing signal. Common synchronous solid-state image sensors acquire the image data only per cycle of the synchronizing signal (e.g., 1/60 second). This can pose problems, for example, in high-speed processing by a mobile object by use of the image data. In view of this, NPL 1, among others, proposes an asynchronous solid-state image sensor having an address event representation (AER) circuit that detects an address event.

With the asynchronous solid-state image sensor described above, an address event occurs in a case where a quantity of light at a given pixel address varies in such a manner that the amount of variation exceeds a threshold value. Specifically, the address events include two kinds, i.e., an on-event that occurs in a case where the light quantity of a pixel varies to exceed a predetermined upper limit, and an off-event that occurs in a case where the light quantity of a pixel drops below a predetermined lower limit. On such an asynchronous solid-state image sensor, a two-bit image data format representing the presence or absence of an on-event or an off-event of each pixel is called the AER format. Techniques involving the use of asynchronous solid-state image sensors are also described in PTL 1, among others.

CITATION LIST

Patent Literature

[PTL 1] Japanese Patent Laid-open No. 2018-186478

Non Patent Literature

[NPL 1] Patrick Lichtsteiner, et al., A 128×128 120 dB 15 μs Latency Asynchronous Temporal Contrast Vision Sensor, IEEE JOURNAL OF SOLID-STATE CIRCUITS, VOL. 43, NO. 2, FEBRUARY 2008.

SUMMARY

Technical Problem

Although the above-described asynchronous solid-state image sensor (also referred to as an event-driven sensor hereunder) is capable of detecting the motion of an object at high speed, the above-described asynchronous solid-state image sensor can obtain only two kinds of information, i.e., an on-event and an off-event as image data. This makes it difficult to detect a luminance gradation of the object. For example, there could conceivably be an arrangement in which a synchronous solid-state image sensor capable of detecting the gradation is provided in conjunction with the event-driven sensor. Then, in a case where the event-driven sensor detects the motion of the object, the synchronous solid-state image sensor would be exposed so as to detect the gradation. In this case, however, the cycle of acquiring the image data including the gradation is restricted by the cycle of the synchronous signal for the synchronous solid-state image sensor. This detracts from the high-speed performance of the event-driven sensor.

In view of the above, the present invention is aimed at providing a sensor system, an image processing apparatus, an image processing method, and a program for enabling detection of the gradation of an object at high speed using even-driven sensors.

Solution to Problem

According to an aspect of the present invention, there is provided a sensor system including a sensor array and a gradation determination section. The sensor array includes a first sensor and a second sensor. The first sensor is configured to detect, with a first sensitivity, a variation in a quantity of light at a first pixel address. The second sensor is configured to detect, with a second sensitivity that is lower than the first sensitivity, a variation in a quantity of light at a second pixel address that is adjacent to or coincides with the first pixel address. The gradation determination section is configured to determine, when the first sensor generates a first event signal in response to a luminance variation event, a gradation of an object having caused the luminance variation event to occur, depending on whether or not the second sensor generates a second event signal in response to the luminance variation event.

According to another aspect of the present invention, there is provided an image processing apparatus including an event signal association section and a gradation determination section. The event signal association section is configured to associate a first event signal with a second event signal. The first event signal is generated in response to a luminance variation event by a first sensor configured to detect, with a first sensitivity, a variation in a quantity of light at a first pixel address. The second event signal is generated in response to the luminance variation event by a second sensor configured to detect, with a second sensitivity that is lower than the first sensitivity, a variation in a quantity of light at a second pixel address that is adjacent to or coincides with the first pixel address. The gradation determination section is configured to determine a gradation of an object having caused the luminance variation event to occur, depending on the presence or absence of the second event signal associated with the first event signal.

According to yet another aspect of the present invention, there is provided an image processing method including a step of causing a first sensor to generate a first event signal in response to a luminance variation event, the first sensor being configured to detect, with a first sensitivity, a variation in a quantity of light at a first pixel address, a step of causing a second sensor to either generate or not generate a second event signal in response to the luminance variation event, the second sensor being configured to detect, with a second sensitivity that is lower than the first sensitivity, a variation in a quantity of light at a second pixel address that is adjacent to or coincides with the first pixel address, a step of associating the first event signal with the second event signal, and a step of determining a gradation of an object having caused the luminance variation event to occur, depending on the presence or absence of the second event signal associated with the first event signal.

According to still another aspect of the present invention, there is provided a program for causing a computer to implement a function of associating a first event signal with a second event signal, the first event signal being generated in response to a luminance variation event by a first sensor configured to detect, with a first sensitivity, a variation in a quantity of light at a first pixel address, the second event signal being generated in response to the luminance variation event by a second sensor configured to detect, with a second sensitivity that is lower than the first sensitivity, a variation in a quantity of light at a second pixel address that is adjacent to or coincides with the first pixel address, and a function of determining a gradation of an object having caused the luminance variation event to occur, depending on the presence or absence of the second event signal associated with the first event signal.

BRIEF DESCRIPTION OF DRAWINGS

FIG. 2A is a diagram explaining principles of calculating a gradation in an embodiment of the present invention.

FIG. 2B is another diagram explaining the principles of calculating a gradation in an embodiment of the present invention.

FIG. 5 is a flowchart indicating an example of processes performed by the first embodiment of the present invention.

FIG. 9 is a diagram depicting a schematic configuration of a system according to a third embodiment of the present invention.

FIG. 10 is a flowchart indicating an example of processes performed by the third embodiment of the present invention.

DESCRIPTION OF EMBODIMENTS

Some preferred embodiments of the present invention are described below in detail with reference to the accompanying drawings. Note that, throughout the ensuing description and the appended drawings, like reference signs designate like or corresponding constituent elements having substantially the same functions, and the explanations of such elements will not be repeated.

First Embodiment

Figure 1:
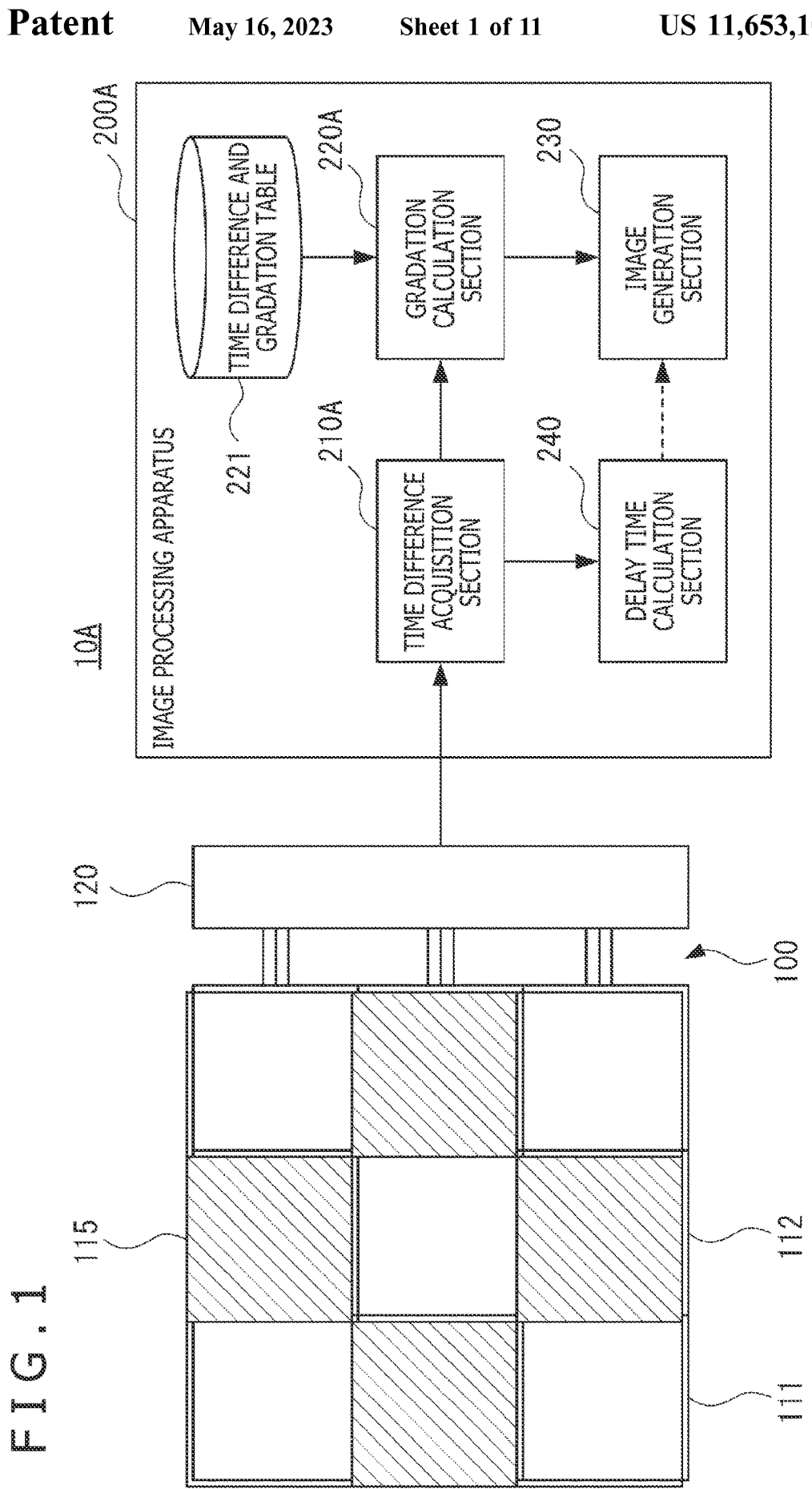
FIG. 1 is a diagram depicting a schematic configuration of a system according to a first embodiment of the present invention.

FIG. 1 is a diagram depicting a schematic configuration of a system according to a first embodiment of the present invention. As depicted, a sensor system 10A includes a sensor module 100 and an image processing apparatus 200A. The sensor module 100 includes a sensor array that includes a first sensor 111 and a second sensor 112 assigned to each pixel, and a signal processing circuit 120 (event signal processing section). The image processing apparatus 200A is implemented by a computer having a communication interface, a processor, and a memory, for example. The image processing apparatus 200A includes a time difference acquisition section 210A and a gradation calculation section 220A both implemented by the processor operating according to programs stored in the memory or received via the communication interface. The image processing apparatus 200A may further include functional portions of an image generation section 230 and a delay time calculation section 240. These components are each explained in more detail below.

The first sensor 111 and the second sensor 112 are each an event-driven sensor (EDS). When the amount of variation in a quantity of light at a given pixel address exceeds a threshold value, the sensor outputs an event signal indicative of occurrence of an address event. In the present embodiment, the sensor array includes the first sensors 111 and second sensors 112 arranged two-dimensionally in a predetermined pattern. The first sensor 111 detects with a first sensitivity the amount of variation in a quantity of light at a first pixel address. The second sensor 112 detects with a second sensitivity the amount of variation in a quantity of light at a second pixel address adjacent to the first pixel address, the second sensitivity being lower than the first sensitivity.

Specifically, the sensitivity of the second sensor 112 (i.e., second sensitivity) is p times (1>p>0) the sensitivity of the first sensor 111 (first sensitivity), for example. The first sensor 111 and the second sensor 112 described above can be implemented by having a filter 115 (e.g., a gray filter or a diaphragm) overlaid on the sensor array so as to reduce a quantity of light incident on the second sensor 112. In this case, the first sensor 111 and the second sensor 112 can be EDSs of the same configuration. In a case where the filter 115 cuts off (1−p) times the quantity of light, the second sensitivity becomes p times the first sensitivity. Alternatively, different bias currents may be caused to flow between the first sensor 111 and the second sensor 112 in order to adjust the sensitivity of the respective sensors.

The signal processing circuit 120 includes a memory and a processor. The processor operates according to a program stored in the memory to process a first event signal generated by the first sensor 111 and a second event signal generated by the second sensor 112. Specifically, the signal processing circuit 120 generates a timestamp for each of the first and second event signals. The timestamp is an example of information indicative of the difference between times at which the first sensor 111 and the second sensor 112 have generated their respective event signals in response to a luminance variation event.

Here, when the luminance variation event (also simply referred to as an event hereunder) such as a motion of an object or a light source change occurs, the amount of variation in a quantity of detected light exceeds a threshold value, which causes the first sensor 111 and the second sensor 112 to generate event signals. As discussed above, the first sensor 111 and the second sensor 112 have different sensitivities with which to detect the variation in the quantity of light. Thus, even in a case where both the first sensor 111 and the second sensor 112 generate their respective event signals, each of the sensors detects a different amount of variation in the quantity of detected light. In the present embodiment, as will be explained later, a gradation of the object is calculated by use of the difference between the times at which the first sensor 111 and the second sensor 112 have generated their respective event signals in response to the same luminance variation event, the sensors being characterized by their different delay times from occurrence of an event until generation of an event signal when the amounts of variation in the quantity of light are different.

Figure 3:
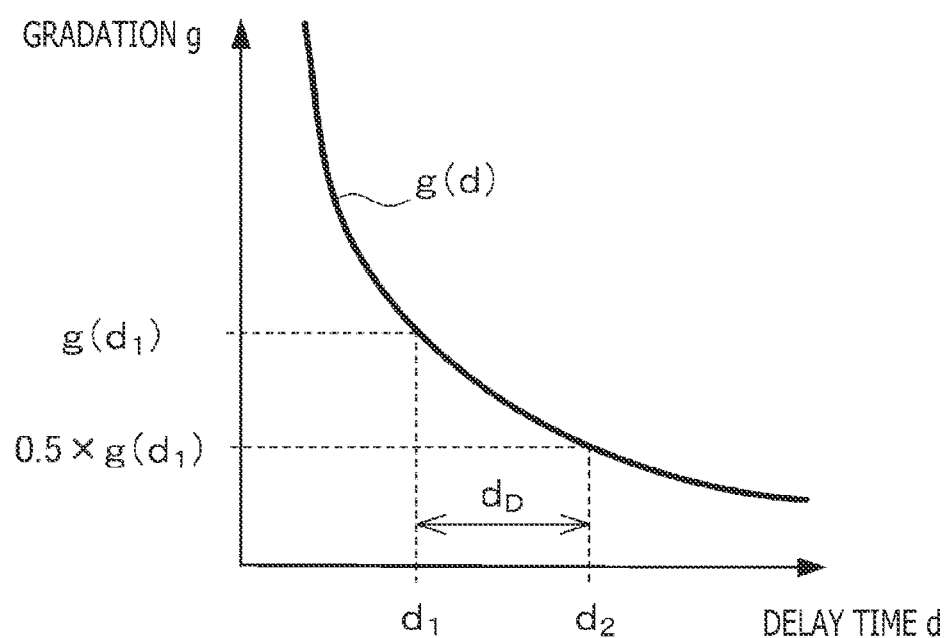
FIG. 3 is still another diagram explaining the principles of calculating a gradation in an embodiment of the present invention.
Figure 4A:
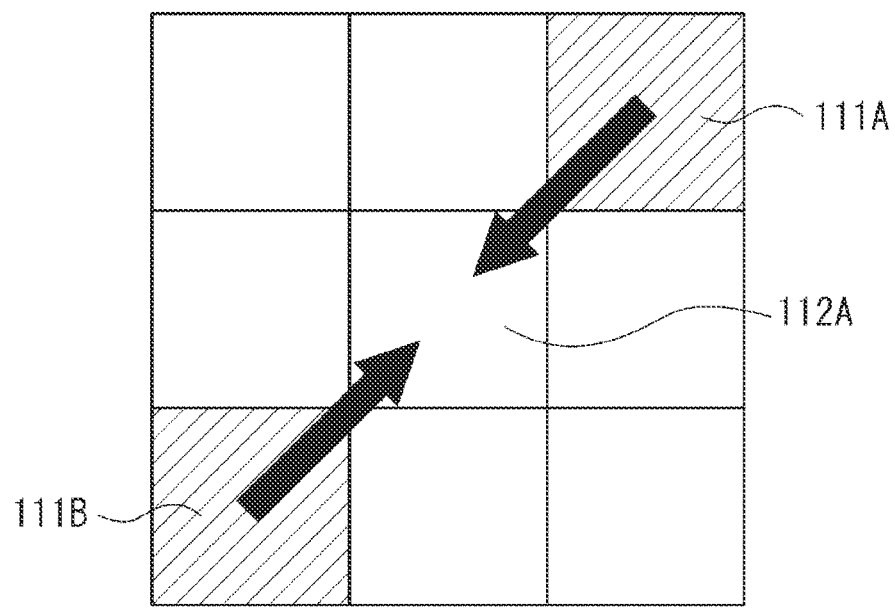
FIG. 4A is a diagram explaining synchronization processing by the first embodiment of the present invention.
Figure 4B:
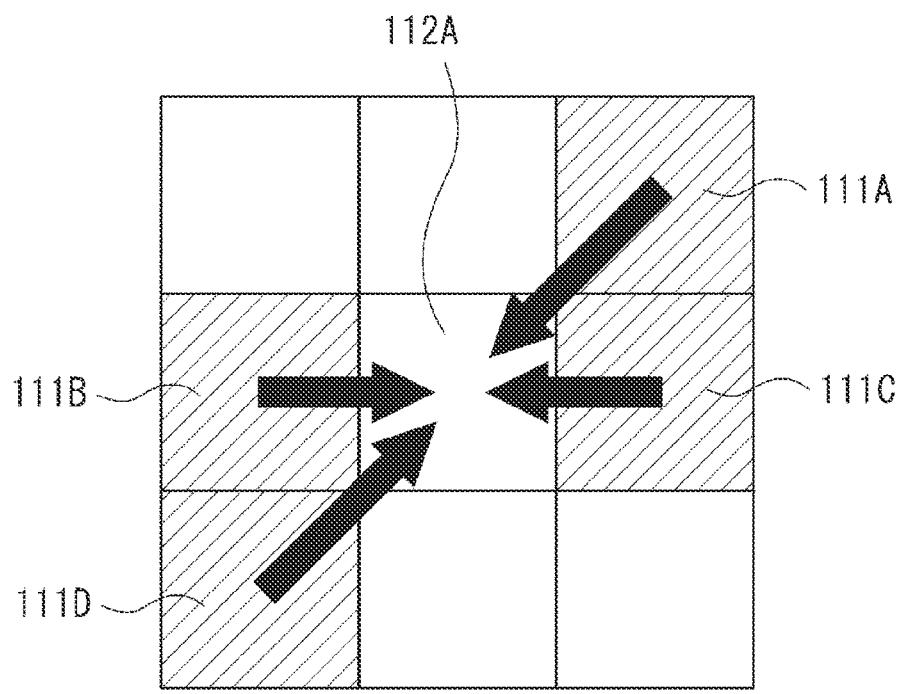
FIG. 4B is another diagram explaining synchronization processing by the first embodiment of the present invention.
Figure 4C:
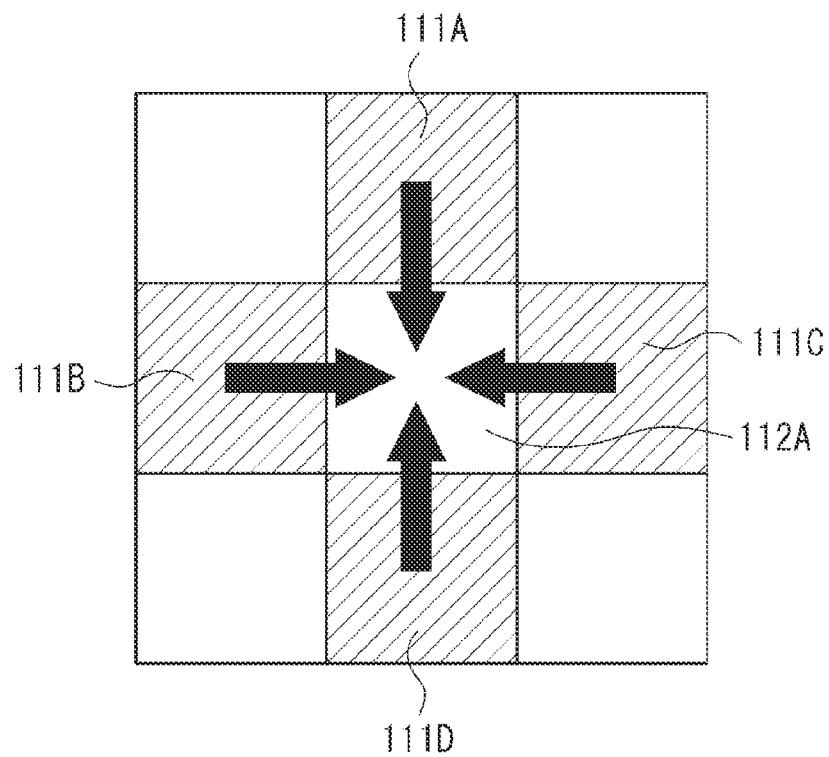
FIG. 4C is still another diagram explaining synchronization processing by the first embodiment of the present invention.
Figure 4D:
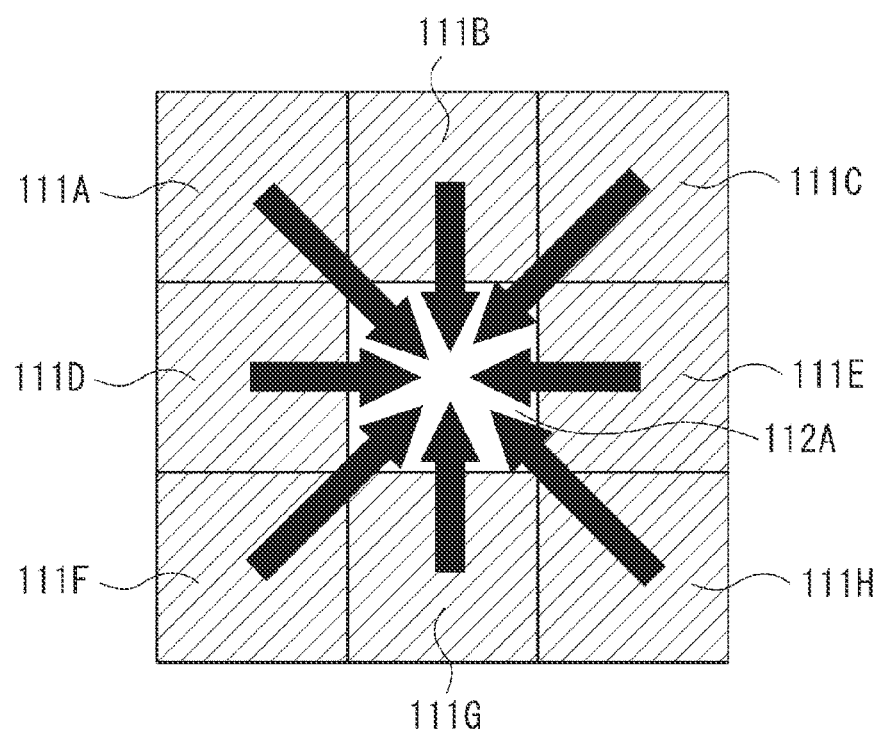
FIG. 4D is yet another diagram explaining synchronization processing by the first embodiment of the present invention.

FIGS. 2A, 2B, and 3 are diagrams explaining principles of calculating a gradation in an embodiment of the present invention. As depicted in FIGS. 2A and 2B, in a case where the motion of a bright (high-gradation) object obj1 causes an event to occur, the amount of variation in luminance is relatively large. In this case, a delay time $d_1$ is assumed to elapse from the time at which the event occurs until the EDS generates an event signal. On the other hand, in a case where the motion of a dark (low-gradation) object obj2 causes an event to occur, the amount of variation in luminance is relatively small. In this case, a delay time $d_2$ that elapses from the time the event occurs until the EDS generates an event signal is longer than the delay time $d_1$ of the object obj1 ($d_1 < d_2$). That is, the higher the gradation of the object is, the shorter the delay time in generating the event signal becomes; the lower the gradation of the object, the longer the delay time in generating the event signal.

In a case where the sensitivity of the second sensor 112 is 50% of that of the first sensor 111 (p=0.5 in the example described above), as depicted in FIG. 3, for example, the luminance change of the event detected by the second sensor 112 becomes 50% of that of the event detected by the first sensor 111. That is, the second sensor 112 detects the gradation of the object that is reduced by 50%. In this case, the difference between the delay time $d_1$ of the first event signal generated by the first sensor 111 and the delay time $d_2$ of the second event signal generated by the second sensor 112 ($d_2 - d_1$) corresponds to 50% of the gradation of the object. Thus, if the relation between the gradations of the object on one hand and the delay times of EDSs on the other hand is measured beforehand, it is possible to calculate the gradation of the object on the basis of the difference between the delay times, i.e., difference between the times at which each sensor generated its event signal.

More specifically, in the present embodiment, for example, the gradation of the object is identified as a function g(d) of a delay time d, by measuring beforehand the relation between the gradations of the object that causes an event to occur and the delay times of the EDSs. Given this, even if the delay times $d_1$ and $d_2$ of the first and second event signals are unknown, as long as a difference $d_D$ between the delay time $d_1$ and the delay time $d_2$ ($d_D = d_2 - d_1$) is known, it is possible to calculate the delay time $d_1$ and the gradation $g(d_1)$ of the object detected by the first sensor 111, in such a manner that the following expression holds:

$$g(d_1 + d_D) = 0.5 \times g(d_1) \quad \text{(Expression 1)}$$

Again with reference to FIG. 1, in the image processing apparatus 200A, the time difference acquisition section 210A acquires, based on the timestamps generated by the signal processing circuit 120, information indicative of the difference between the times at which the first and second sensors generated their respective event signals in response to the same luminance variation event. As another example, in a case where the image processing apparatus 200A includes the signal processing circuit 120, for example, the signal processing circuit 120 may directly acquire information indicative of the time difference between the first event signal and the second event signal apart from the timestamps for the first and second signals of the first and second sensors.

The gradation calculation section 220A calculates the gradation of the object having caused a luminance variation event to occur, on the basis of the information indicative of the time difference acquired by the time difference acquisition section 210A. As explained above with reference to FIGS. 2A, 2B and 3, if the relation between the gradations of the object causing an event to occur and the delay times of the EDSs is measured beforehand, it is possible to calculate the gradation of the object on the basis of the difference between the times at which the event signals have been generated. In the present embodiment, a time difference and gradation table 221 is stored in the memory of the image processing apparatus 200A. The gradation calculation section 220A calculates the gradation of the object by referencing the time difference and gradation table 221.

The gradation of the object calculated by the gradation calculation section 220A performing the above-described processing may be used, for example, by the image generation section 230 in generating an image of the object by use of the event signals. In this case, the first and second event signals may be synchronized with each other by processes to be discussed later. Alternatively, the gradation of the object calculated by the gradation calculation section 220A may be used to select the processes on the object recognized from the event signals. The functional portions that perform the above-mentioned processes may be implemented internally by the image processing apparatus 200A or by an external apparatus that receives the information indicative of the gradation of the object from the image processing apparatus 200A.

Given the information indicative of the time difference acquired by the time difference acquisition section 210A, the delay time calculation section 240 calculates a delay time from detection of a luminance variation event in the first sensor 111 until generation of an event signal therein. As explained above with reference to FIG. 3, in a case where the gradation of the object is expressed as the function g(d) of the delay time d, the delay time $d_1$ can be calculated in such a manner that $g(d_1 + d_D) = 0.5 \times g(d_1)$ holds from the difference $d_D = d_2 - d_1$ even when the delay times $d_1$ and $d_2$ are unknown. In like manner, the delay time calculation section 240 may calculate the delay time $d_2$ of the second sensor 112.

The delay times calculated by the delay time calculation section 240 as described above may be used, for example, to identify a true time of occurrence of the event excluding the delay times. Specifically, the true time of occurrence of the event detected by the first sensor 111 can be identified by subtracting the delay time $d_1$ from the timestamp for the first event signal generated by the first sensor 111. Whereas the image processing apparatus 200A in the present embodiment includes both the gradation calculation section 220A and the delay time calculation section 240, the image processing apparatus in other embodiments may only include either the gradation calculation section 220A or the delay time calculation section 240.

FIGS. 4A through 4D are diagrams explaining synchronization processing by the first embodiment of the present invention. As discussed above, the first sensor 111 and the second sensor 112 have different delay times from occurrence of a luminance variation event until generation of an event signal. With the present embodiment, the difference between the delay times is used for calculating the gradation of the object. Meanwhile, there occurs a difference between timestamps corresponding to the difference between the delay times between the first event signal generated by the first sensor 111 and the second event signal generated by the second sensor 112.

In view of this, in the illustrated example, the timestamp for the second event signal generated by a second sensor 112A is replaced with a mean value of the timestamps for the event signals generated by the adjacent first sensors 111A through 111H, and the second event signal is thereby synchronized with the first event signal. FIGS. 4A through 4D indicate examples in which two, four, and eight first sensors 111 adjacent to the second sensor 112A and each generating an event signal. For example, when event signals are generated in a manner synchronized with each other apart from the event signals input to the gradation calculation section 220A or to the delay time calculation section 240, the motion of the object can be identified on the basis of the event detected at all pixels in the sensor array that includes both the first pixel address provided with the first sensor 111 and the second pixel address provided with the second sensor 112 (i.e., without reduction of the resolution).

Note that the above-described synchronization processing need not be necessarily performed. For example, on the basis of the first event signal generated by the first sensor 111, the motion of the object may be identified using solely the event detected at the first pixel address provided with the first sensor 111. In this case, the resolution is reduced by an amount corresponding to the unuse of the event detected at the second pixel address. However, the reduction in the resolution can be compensated by known interpolation techniques such as linear interpolation. Further, in a case where a high resolution is not necessary, only the event signal acquired at the first pixel address may be used to identify the motion of the object without performing the synchronization or interpolation processing. Alternatively, in the pattern where the first sensors 111 and the second sensors 112 are arranged, the number of the first sensors 111 may be made larger than that of the second sensors 112. This arrangement makes it possible to maintain the resolution for identifying the motion of the object, with the gradation calculated at a bare minimum resolution.

FIG. 5 is a flowchart indicating an example of processes performed by the first embodiment of the present invention. In the indicated example, first, the first sensor 111 in the sensor module 100 generates a first event signal in response to a luminance variation event (step S101). Following a short delay from that time, the second sensor 112 generates a second event signal in response to the same luminance variation event (step S102). As described above, such a time difference between the first event signal and the second event signal occurs because the amount of variation in luminance is different when detected by the first sensor 111 and by the second sensor 112, the second sensor 112 being less sensitive than the first sensor 111.

Next, in the image processing apparatus 200A, the time difference acquisition section 210A acquires information indicative of the difference between the times at which the first sensor 111 and the second sensor 112 have generated the first event signal and the second event signal, respectively (step S103). Specifically, on the basis of the timestamps for the first and second event signals generated by the signal processing circuit 120, the time difference acquisition section 210A acquires the information indicative of the difference between the times at which the first and second sensors have generated their respective event signals in response to the same luminance variation event (in steps S101 and S102 above).

Further, on the basis of the information indicative of the time difference acquired by the time difference acquisition section 210A, the gradation calculation section 220A calculates the gradation of the object having caused the luminance variation event to occur (step S104). As explained above with reference to FIG. 1, the gradation calculation section 220A at this point may reference the time difference and gradation table 221 stored in the memory of the image processing apparatus 200A. In the indicated example, the image generation section 230 generates an image of the object by use of the calculated gradation and the event signals (step S105). Alternatively, the gradation calculated as described above may also be used in the generation of the image or may be used in other processes instead of in the image generation.

Figure 6:
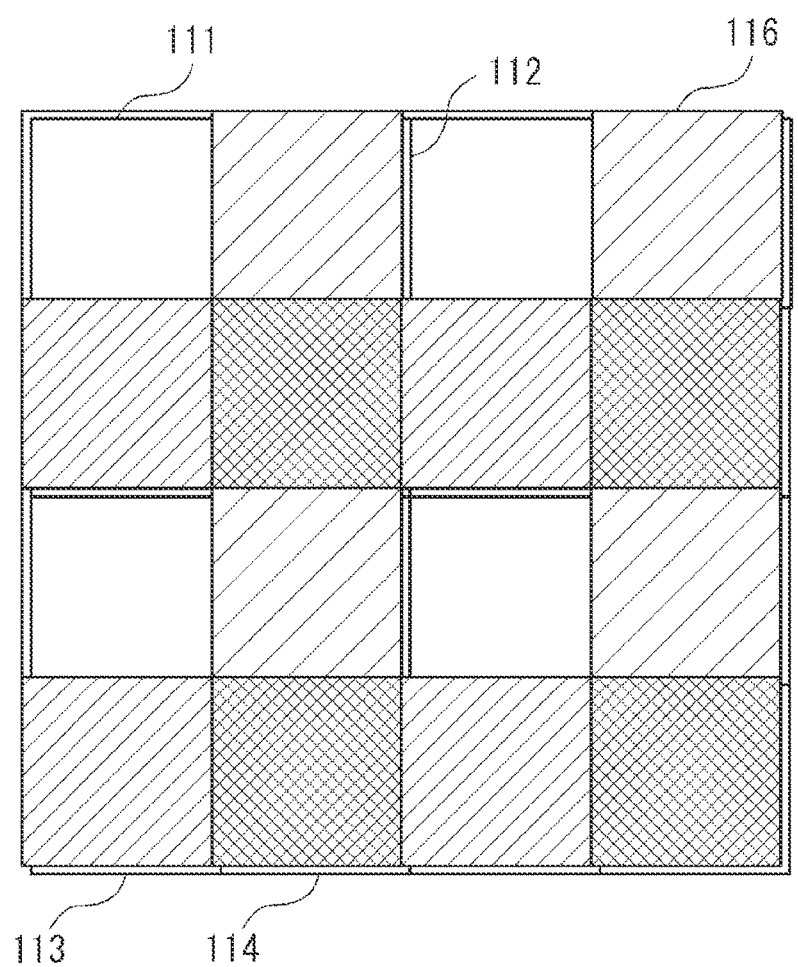
FIG. 6 is a diagram depicting another example of a sensor arrangement in the first embodiment of the present invention.

FIG. 6 is a diagram depicting another example of the sensor arrangement in the first embodiment of the present invention. In the illustrated example, the sensor array of the sensor module 100 includes the first sensor 111, the second sensor 112, a third sensor 113, and a fourth sensor 114 arranged two-dimensionally in a predetermined pattern. In addition to the first sensor 111 and the second sensor 112 similar to those in the example explained above with reference to FIG. 1, the third sensor 113 detects with a third sensitivity the amount of variation in a quantity of light at a third pixel address adjacent to at least any one of the first and second pixel addresses, the third sensitivity being lower than the second sensitivity. The fourth sensor 114 detects with a fourth sensitivity the amount of variation in a quantity of light at a fourth pixel address adjacent to at least any one of the first through third pixel addresses, the fourth sensitivity being lower than the third sensitivity. The signal processing circuit 120 (not depicted) generates the timestamps for the event signals generated respectively by the first through fourth sensors 111 through 114.

In the above example, the sensitivity of the second sensor 112 (second sensitivity), the sensitivity of the third sensor 113 (third sensitivity), and the sensitivity of the fourth sensor 114 (fourth sensitivity) are $p_2$ times, $p_3$ times, and $p_4$ times ($1>p_2>p_3>p_4>0$) the sensitivity of the first sensor 111 (first sensitivity), respectively, for example. Specifically, it may be arranged such that $p_2=0.75$, $p_3=0.5$, and $p_4=0.25$. The first through fourth sensors 111 through 114 described above can be implemented, for example, by a filter 116 (e.g., a gray filter or a diaphragm) that is overlaid on the sensor array and reduces the quantity of light incident on the second through fourth sensors 112 through 114. In the above example, the filter 116 cuts off 25% of the quantity of light incident on the second sensor 112, 50% of the quantity of light incident on the third sensor 113, and 75% of the quantity of light incident on the fourth sensor 114.

In the above case, the luminance change of the event detected by the second sensor 112, the third sensor 113, and the fourth sensor 114 is 75%, 50%, and 25%, respectively, of the luminance change of the event detected by the first sensor 111. The differences between the delay times $d_1$ through $d_4$ of the first through fourth event signals respectively generated by the first sensor 111 through fourth sensor 114, i.e., $(d_4-d_1)$, $(d_3-d_1)$, and $(d_2-d_1)$, correspond respectively to 75%, 50%, and 25% of the gradation of the object.

In the present embodiment, as described above, in a case where more than two sensitivities are set for the sensors arranged in the sensor array, multiple conditional expressions such as the Expression 1 above may be established.

This makes it possible to find precisely the delay time $d_1$ that meets the conditions involved regardless of the function g(d) indicative of the gradation of the object. Alternatively, in consideration of an error in the amount of sensitivity reduction of each of the sensors (e.g., the possibility that the sensitivity of the second sensor 112 may not be exactly 0.5 times that of the first sensor 111), it is possible to obtain the results of gradation calculation stably by averaging the gradations calculated from the time difference between the first event signal and the second event signal, from the time difference between the first event signal and the third event signal, and from the time difference between the first event signal and the fourth event signal.

According to the first embodiment of the present invention explained above, the sensors with different sensitivities for detecting variations in the quantity of light are arranged at pixel addresses adjacent to one another. The gradation of the object is then calculated from the time differences between the event signals generated by the different sensors. This makes it possible to detect the gradation of the object without detracting from the high-speed performance of the EDSs. In addition, because the sensors with different sensitivities are arranged two-dimensionally and adjacent to each other inside the sensor array of the present embodiment, the detection of gradation is easily implemented by combining common EDSs having a uniform sensitivity with a filter such as a gray filter.

Second Embodiment

Figure 7:
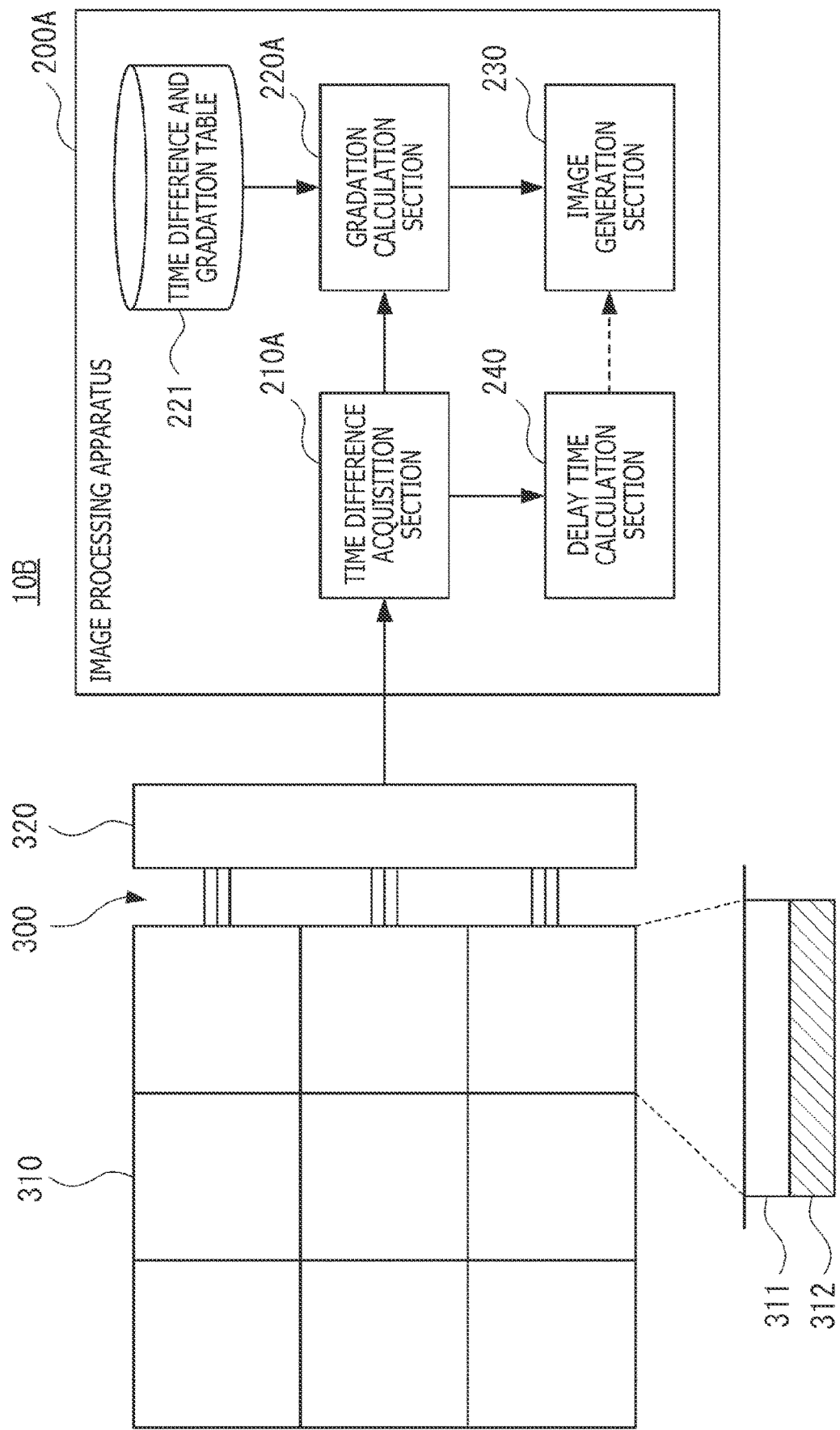
FIG. 7 is a diagram depicting a schematic configuration of a system related to a second embodiment of the present invention.

FIG. 7 is a diagram depicting a schematic configuration of a system according to a second embodiment of the present invention. In the illustrated example, a sensor system 10B includes a sensor module 300 and the image processing apparatus 200A. The sensor module 300 includes a sensor array that includes a stacked sensor 310 assigned to each pixel, and a signal processing circuit 320 (event signal processing section). Note that the configuration of the image processing apparatus 200A is similar to that of the above-described first embodiment, and the description of the image processing apparatus 200A thus will be omitted. These components are each explained below in more detail.

The stacked sensor 310 has a first light-receiving layer 311 constituting a first sensor and a second light-receiving layer 312 constituting a second sensor stacked one on top of the other. The first light-receiving layer 311 is arranged on the light incident side, i.e., close to the object. The light from the object enters the second light-receiving layer 312 as well after passing through the first light-receiving layer 311. The first light-receiving layer 311 detects with a first sensitivity the variation in the quantity of light at the pixel address provided with the sensor 310. The second light-receiving layer 312 detects with a second sensitivity the variation in the quantity of light at the same pixel address, the second sensitivity being lower than the first sensitivity. In the present embodiment, a first pixel address provided with the first sensor constituted by the first light-receiving layer 311 and a second pixel address provided with the second sensor constituted by the second light-receiving layer 312 coincide with each other.

Specifically, the sensitivity of the second light-receiving layer 312 (second sensitivity) is p times (1>p>0) the sensitivity of the first light-receiving layer 311 (first sensitivity), for example. The stacked sensor 310 described above is implemented, for example, by setting the quantum efficiency of the first light-receiving layer 311 to $p_1$ (1>$p_1$>0) and the quantity efficiency of the second light-receiving layer 312 to $p_2$ ((1-$p_1$)>$p_2$>0). In this case, the sensitivity of the second light-receiving layer 312 becomes $p_2/p_1$ (p=$p_2/p_1$) times that of the first light-receiving layer 311. Incidentally, the quantum efficiency is an index indicating the percentage of the probability of detection per photon. As will be discussed later in examples, the EDS 310 may have a multilayer structure constituted by more than two layers.

The signal processing circuit 320 includes a memory and a processor. By operating according to programs stored in the memory, the processor processes a first event signal and a second event signal, the first event signal being generated by the first sensor constituted by the first light-receiving layer 311, the second event signal being generated by the second sensor constituted by the second light-receiving layer 312. Specifically, the signal processing circuit 320 generates a timestamp for each of the first and second event signals. The timestamp is an example of information indicative of the difference between the times at which the first sensor constituted by the first light-receiving layer 311 and the second sensor constituted by the second light-receiving layer 312 generated their respective event signals in response to a luminance variation event.

As described above, by obtaining the information indicative of the difference between the times at which first and the second sensors assigned to the same pixel address have generated their respective event signals in response to a luminance variation event, the present embodiment, as with the above-described first embodiment, enables the image processing apparatus 200A to calculate the gradation of the object having caused the luminance variation event to occur. Note that, because the present embodiment allows both the first event signal and the second event signal to be generated at all pixels in the sensor array, it is not necessary for the image generation section 230 to synchronize the first and second event signals when, for example, generating an image of the object by use of the first and second event signals. The image generation section 230 may identify the motion of the object by use of only the first event signal.

Figure 8:
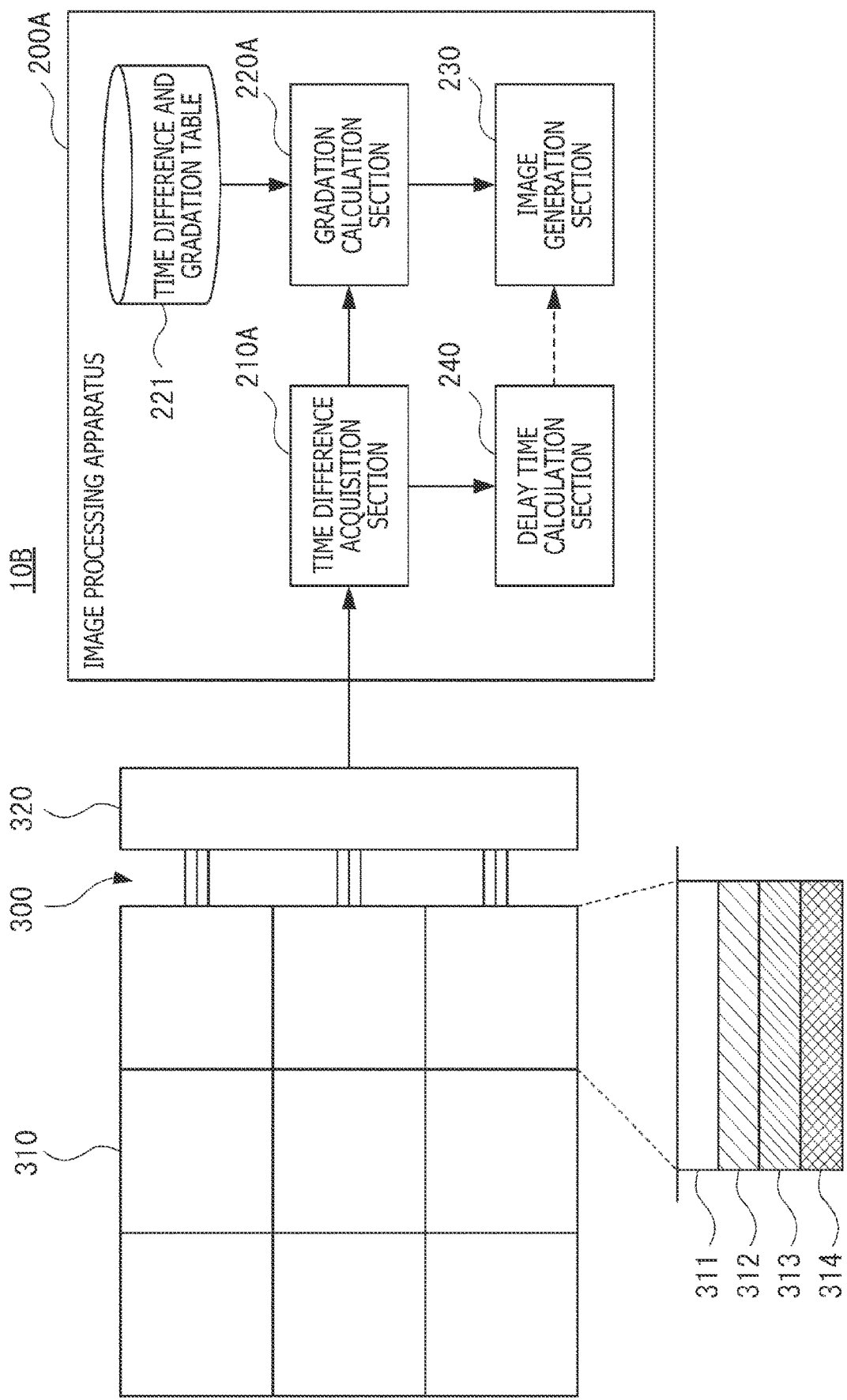
FIG. 8 is a diagram depicting another example of a sensor arrangement in the second embodiment of the present invention.

FIG. 8 is a diagram depicting another example of a sensor arrangement in the second embodiment of the present invention. In the illustrated example, the stacked sensor 310 has the first light-receiving layer 311, the second light-receiving layer 312, a third light-receiving layer 313, and a fourth light-receiving layer 314 stacked in that order from the light incident side. The first through third light-receiving layers 311 through 313 are transmissive layers. The light from the object enters the fourth light-receiving layer 314 after passing through the first light-receiving layer 311, the second light-receiving layer 312, and the third light-receiving layer 313. In addition to the first light-receiving layer 311 and second light-receiving layer 312 similar to those explained above with reference to FIG. 7, the third light-receiving layer 313 detects with a third sensitivity the variation in the quantity of light at the pixel address provided with the sensor 310, the third sensitivity being lower than the second sensitivity, the third light-receiving layer 313 thus constituting a third sensor. The fourth light-receiving layer 314 detects with a fourth sensitivity the variation in the quantity of light at the same address, the fourth sensitivity being lower than the third sensitivity, the fourth light-receiving layer 314 thus constituting a fourth sensor. The signal processing circuit 120 generates timestamps for the event signals generated respectively by the sensors constituted by the first through fourth light-receiving layers 311 through 314.

In the above example, the sensitivity of the second light-receiving layer 312 (second sensitivity), the sensitivity of the third light-receiving layer 313 (third sensitivity), and the sensitivity of the fourth light-receiving layer 314 (fourth sensitivity) are $p_2$ times, $p_3$ times, and $p_4$ times ($1>p_2>p_3>p_4>0$) the sensitivity of the first light-receiving layer 311 (first sensitivity), respectively, for example. Specifically, it may be arranged such that $p_2=0.5$, $p_3=0.25$, and $p_4=0.125$. The EDS 310 described above is implemented, for example, by setting the quantum efficiency of the first light-receiving layer 311 to 40%, the quantity efficiency of the second light-receiving layer 312 to 20%, the quantity efficiency of the third light-receiving layer 313 to 10%, and the quantity efficiency of the fourth light-receiving layer 314 to 5%.

In the above case, the luminance change of an event detected by the second light-receiving layer 312, by the third light-receiving layer 313, and by the fourth light-receiving layer 314 is 50%, 25%, and 12.5%, respectively, of the luminance change of the event detected by the first light-receiving layer 311. The differences between the delay times $d_1$ through $d_4$ of the first through fourth event signals respectively generated by the first through fourth light-receiving layers 311 through 314, i.e., $(d_4-d_1)$, $(d_3-d_1)$, and $(d_2-d_1)$, correspond respectively to 50%, 25%, and 12.5% of the gradation of the object. This makes it possible, as in the example explained above with reference to FIG. 6, to find precisely the delay time that meets the conditions involved or to obtain the results of gradation calculation stably, for example.

According to the second embodiment of the present invention explained above, the light-receiving layers each having a different sensitivity for detecting the variation in the quantity of light are stacked on the same pixel address. The time differences between the event signals generated by the respective light-receiving layers are used to calculate the gradation of the object. In this manner, as with the first embodiment, it is possible to detect the gradation of the object without detracting from the high-speed performance of the EDSs. In addition, because the sensors each having a different sensitivity are stacked on the same pixel address in the present embodiment, it is possible to calculate the gradation of the object without reducing the resolution.

Third Embodiment

FIG. 9 is a diagram depicting a schematic configuration of a system according to a third embodiment of the present invention. The example in FIG. 9 is explained as a modification of the example discussed above with reference to FIG. 8. That is, in the present embodiment, a sensor system 10C includes the sensor module 300 that includes the sensor 310 having a four-layered structure, and an image processing apparatus 200C. The sensor module 300 includes a sensor array that includes stacked sensors 310 as in the above-described second embodiment, and the signal processing circuit 320. The image processing apparatus 200C is implemented by a computer having a communication interface, a processor, and a memory, for example. The image processing apparatus 200C includes the functional portions of an event signal association section 210C and a gradation determination section 220C, which are implemented by the processor operating according to programs stored in the memory or received via the communication interface. The image processing apparatus 200C may further include the functional portion of the image generation section 230. Each of these components of the image processing apparatus 200C is explained below in more detail.

The event signal association section 210C associates second through fourth event signals with a first event signal input from the signal processing circuit 320. Here, the first event signal is generated by a first sensor constituted by the first light-receiving layer 311 in response to a luminance variation event. The second through fourth event signals associated with the first event signal are generated by second through fourth sensors constituted respectively by the second through fourth light-receiving layers 312 through 314, in response to the same luminance variation event as that responded to by the first sensor.

As explained above with reference to FIGS. 2A, 2B and 3, the delay time from occurrence of an event until generation of an event signal varies with the sensitivity of the sensor. Thus, whereas the second through fourth event signals correspond to the same luminance variation event as that with the first event signal, the second through fourth event signals are generated later than the first event signal. The event signal association section 210C associates event signals, based on the sequence of the respective event signals and on the intervals between their timestamps, for example.

Specifically, in a case where the second event signal is generated after the first event signal and where the interval between the timestamps for the first and second event signals falls within a predetermined range, the event signal association section 210C associates the second event signal with the first event signal. In a case where there is no such second event signal, the event signal association section 210C does not associate the first event signal with a second event signal. Likewise, in a case where the third event signal is generated after the second event signal and where the interval between the timestamps for the second and third event signals falls within a predetermined range, the event signal association section 210C associates the third event signal with the first event signal. In a case where there is no such third event signal and where the second event signal is not associated with the first event signal, the event signal association section 210C does not associate the third event signal with the first event signal.

The gradation determination section 220C determines the gradation of the object according to the result of the event signal association performed by the event signal association section 210C. As explained above with reference to FIG. 8, the first through fourth light-receiving layers 311 through 314 of the stacked sensor 310 are configured in such a manner that their sensitivities gradually decrease with regard to the variation in the quantity of light. For this reason, in a case where the gradation of the object having caused a luminance variation event to occur is low, those amounts of variation in the quantity of light that are detected by the light-receiving layers with relatively low sensitivities do not exceed a threshold value, so that the sensors constituted by these light-receiving layers do not generate event signals. Specifically, in a case where the luminance change of an event is largest and where the first light-receiving layer 311 generates an event signal, the second through fourth light-receiving layers 312 through 314 also generate event signals. As the luminance change gradually decreases, the fourth light-receiving layer 314 with the lowest sensitivity first stops generating its event signal. As the luminance change further decreases, the third light-receiving layer 313 also stops generating its event signal. In a case where the luminance change is the smallest detectable change, the second light-receiving layer 312 also stops generating its event signal, and only the first light-receiving layer 311 generates the event signal.

In the present embodiment, the gradation determination section 220C determines the gradation of the object according to the above-described relation between the gradations of the object and the generation of each event signal. Specifically, in a case where all of the second through fourth event signals are associated with the first event signal by the event signal association section 210C, the gradation determination section 220C determines that the gradation of the object is at the highest level. On the other hand, in a case where there are the second and third event signals associated with the first event signal but there is no fourth event signal, the gradation determination section 220C determines that the gradation of the object is at the second highest level. In a case where there is only the second event signal associated with the first event signal, the gradation determination section 220C determines that the gradation of the object is at the third highest level. In a case where there is no event signal associated with the first event signal, the gradation determination section 220C determines that the gradation of the object is at the lowest level. The gradation of the object determined in this manner is used by the image generation section 230 in generating an image of the object, or is used for selecting the processes on the object recognized from the event signals, for example, as in the case of the first embodiment.

FIG. 10 is a flowchart indicating an example of processes performed by the third embodiment of the present invention. For the purpose of simplification, what is explained by FIG. 10 is the determination using the first and second event signals. The same explanation applies to the determination using the third and fourth event signals as well. In the indicated example, first, the first light-receiving layer 311 constituting the first sensor in the sensor module 300 generates the first event signal in response to a luminance variation event (step S201). Following a short delay from that time, the second light-receiving layer 312 constituting the second sensor generates the second event signal in response to the same luminance variation event (step S202). Note that, in a case where the amount of variation in the quantity of light incident on the second light-receiving layer 312 with a relatively low sensitivity does not exceed a threshold value, the second event signal is not generated.

Next, in the image processing apparatus 200C, the event signal association section 210C determines whether or not the second event signal is associated with the first event signal (step S203). Specifically, the event signal association section 210C determines the presence or absence of the association, based on the sequence of the first and second event signals which is indicated by their timestamps and on the intervals between their timestamps. In a case where the second event signal is associated with the first event signal, the gradation determination section 220C determines that the gradation of the object is at a relatively high level (step S204). On the other hand, in a case where the second event signal is not associated with the first event signal, the gradation determination section 220C determines that the gradation of the object is at a relatively low level (step S205).

Whereas the sensor 310 in the illustrated example has the four-layered structure including the first through fourth light-receiving layers 311 through 314, the sensor 310 in another example may have a two-layered structure similar to that in the example in FIG. 7. The sensor 310 in other examples may have a three-layered structure or a structure of more than four layers. In a further example, the sensor module may include a sensor array having sensors with different sensitivities arranged two-dimensionally in a predetermined pattern, as explained above with reference to FIGS. 1 and 6.

According to the above-described third embodiment of the present invention, the light-receiving layers with different sensitivities for detecting the variation in the quantity of light are stacked on the same pixel address. The gradation of the object is determined by verifying how many of the stacked light-receiving layers have generated event signals. This makes it possible to detect the gradation of the object without detracting from the high-speed performance of the EDSs, as with the first embodiment. Although the present embodiment permits detection of only the same number of gradations of the object as the number of light-receiving layer sensitivities, the embodiment is easy to use because there is no need for measuring beforehand the relation between the gradations of the object and the delay times of the EDSs. Also, the easy determination by the present embodiment enables stable identification of the gradation of the object.

The embodiments of the present invention can be used in conjunction with a game controller, a smartphone, and various mobile objects (e.g., a car, an electric vehicle, a hybrid electric vehicle, a motorcycle, a bicycle, a personal mobility device, an aircraft, a drone, a ship, and a robot), to acquire information regarding the surrounding environment, to estimate the self-position relative to the positions of nearby objects, or to take evasive action upon detection of an incoming flying object. The gradation of the object can be useful in spotting or identifying the object with regard to the above-mentioned purposes.

Whereas some preferred embodiments of the present invention have been described above in detail with reference to the accompanying drawings, the present invention is not limited to such examples. It is obvious that those skilled in the art will easily conceive modifications or alternatives of the invention within the scope of the technical idea stated in the appended claims. It is to be understood that such variations and alternatives also fall within the technical scope of the present invention.

REFERENCE SIGNS LIST

10A, 10B, 10C: Sensor system
100: Sensor module
111: First sensor
112: Second sensor
113: Third sensor
114: Fourth sensor
115, 116: Filter
120: Signal processing circuit
200A, 200C: Image processing apparatus
210A: Time difference acquisition section
210C: Event signal association section
220A: Gradation calculation section
220C: Gradation determination section
230: Image generation section
240: Delay time calculation section
300: Sensor module
310: Sensor
311: First light-receiving layer
312: Second light-receiving layer
313: Third light-receiving layer
314: Fourth light-receiving layer
320: Signal processing circuit

The invention claimed is:

1. A sensor system comprising:
a sensor array including a first sensor and a second sensor, the first sensor being configured to detect, with a first sensitivity, a variation in a quantity of light at a first pixel address, the second sensor being configured to detect, with a second sensitivity that is lower than the first sensitivity, a variation in a quantity of light at a second pixel address that is adjacent to or coincides with the first pixel address; and a gradation determination section configured to determine, when the first sensor generates a first event signal in response to a luminance variation event, a gradation of an object having caused the luminance variation event to occur, depending on whether or not the second sensor generates a second event signal in response to the luminance variation event.

2. The sensor system according to claim 1, wherein the sensor array includes a stacked sensor having a first light-receiving layer of a transmissive type and a second light-receiving layer stacked on the first light-receiving layer, the first light-receiving layer constituting the first sensor, the second light-receiving layer constituting the second sensor, and the second pixel address coincides with the first pixel address.

3. The sensor system according to claim 2, wherein the second light-receiving layer is of a transmissive type, the stacked sensor has a third light-receiving layer further stacked thereon, the third light-receiving layer constituting a third sensor configured to detect, with a third sensitivity that is lower than the second sensitivity, a variation in a quantity of light at the first pixel address, and when the second sensor generates the second event signal in response to the luminance variation event, the gradation determination section determines a gradation of the object depending on whether or not the third sensor generates a third event signal in response to the luminance variation event.

4. An image processing apparatus comprising:

an event signal association section configured to associate a first event signal with a second event signal, the first event signal being generated in response to a luminance variation event by a first sensor configured to detect, with a first sensitivity, a variation in a quantity of light at a first pixel address, the second event signal being generated in response to the luminance variation event by a second sensor configured to detect, with a second sensitivity that is lower than the first sensitivity, a variation in a quantity of light at a second pixel address that is adjacent to or coincides with the first pixel address; and a gradation determination section configured to determine a gradation of an object having caused the luminance variation event to occur, depending on presence or absence of the second event signal associated with the first event signal.

5. The image processing apparatus according to claim 4, wherein the event signal association section associates the first event signal with a third event signal generated in response to the luminance variation event by a third sensor configured to detect, with a third sensitivity that is lower than the second sensitivity, a variation in a quantity of light at a third pixel address that is adjacent to or coincides with the first pixel address, and the gradation determination section determines the gradation of the object depending on presence or absence of the third event signal associated with the first event signal.

6. An image processing method comprising:

causing a first sensor to generate a first event signal in response to a luminance variation event, the first sensor being configured to detect, with a first sensitivity, a variation in a quantity of light at a first pixel address;

causing a second sensor to either generate or not generate a second event signal in response to the luminance variation event, the second sensor being configured to detect, with a second sensitivity that is lower than the first sensitivity, a variation in a quantity of light at a second pixel address that is adjacent to or coincides with the first pixel address;

associating the first event signal with the second event signal; and determining a gradation of an object having caused the luminance variation event to occur, depending on presence or absence of the second event signal associated with the first event signal.

7. A non-transitory, computer readable storage medium containing a program, which when executed by a computer, causes the computer to perform an image processing method by carrying out actions, comprising:

associating a first event signal with a second event signal, the first event signal being generated in response to a luminance variation event by a first sensor configured to detect, with a first sensitivity, a variation in a quantity of light at a first pixel address, the second event signal being generated in response to the luminance variation event by a second sensor configured to detect, with a second sensitivity that is lower than the first sensitivity, a variation in a quantity of light at a second pixel address that is adjacent to or coincides with the first pixel address; and determining a gradation of an object having caused the luminance variation event to occur, depending on presence or absence of the second event signal associated with the first event signal.

* * * * *